United States Patent
Farnworth et al.

(10) Patent No.: US 9,856,180 B2
(45) Date of Patent: Jan. 2, 2018

(54) PELLETISING AN EVAPORITE MINERAL

(71) Applicant: Sirius Minerals PLC, London (GB)

(72) Inventors: Steve Farnworth, Derby (GB); Mike Evans, Staffordshire (GB); Jim Evans, Staffordshire (GB)

(73) Assignee: Sirius Minerals PLC, London (GB)

( * ) Notice: Subject to any disclaimer, the term of this patent is extended or adjusted under 35 U.S.C. 154(b) by 0 days.

(21) Appl. No.: 15/316,127

(22) PCT Filed: Jun. 1, 2015

(86) PCT No.: PCT/GB2015/051593
§ 371 (c)(1),
(2) Date: Dec. 2, 2016

(87) PCT Pub. No.: WO2015/185908
PCT Pub. Date: Dec. 10, 2015

(65) Prior Publication Data
US 2017/0137333 A1 May 18, 2017

(30) Foreign Application Priority Data
Jun. 2, 2014 (GB) .................. 1409800.8

(51) Int. Cl.
*B01J 2/14* (2006.01)
*C05G 3/00* (2006.01)
*C05D 1/00* (2006.01)

(52) U.S. Cl.
CPC ............. *C05G 3/0058* (2013.01); *B01J 2/14* (2013.01); *C05D 1/005* (2013.01)

(58) Field of Classification Search
None
See application file for complete search history.

(56) References Cited

U.S. PATENT DOCUMENTS 3,408,169 A * 10/1968 Thompson ............... B01J 2/14
 23/302 A
3,630,713 A * 12/1971 Adams ................... C05D 1/005
 71/61
4,726,755 A  2/1988 Holley
(Continued)

FOREIGN PATENT DOCUMENTS

DE       1024244 B    2/1958
WO   WO-00/62916 A1  10/2000
WO  WO-2014/026048 A2  2/2014

OTHER PUBLICATIONS

Search Report Issued in GB1409800.8 dated Dec. 23, 2014.
International Search Report issue in PCT/GB2015/051593 dated Sep. 15, 2015.

*Primary Examiner* — Wayne Langel
(74) *Attorney, Agent, or Firm* — Mintz Levin Cohn Ferris Glovsky and Popeo, P.C.

(57) ABSTRACT

A method for forming a pelletized evaporite mineral product, the method comprising: forming a material comprising a liquid and at least 50% by mass of an evaporite mineral powder; and processing the material using a pan pelletizer to form pellets comprising the material, the pan pelletizer being configured so that the mean dwell time of the material in the pan of the pelletizer is in the range from 60 to 120 seconds and the mean diameter of the pellets formed by the pelletizer is in the range from 1 to 8 mm.

16 Claims, 1 Drawing Sheet

(56) References Cited

U.S. PATENT DOCUMENTS

| | | | |
|---|---|---|---|
| 5,435,821 A | | 7/1995 | Duvdevani et al. |
| 5,460,765 A | * | 10/1995 | Derdall ..................... B01J 2/14 |
| | | | 23/313 P |
| 6,013,209 A | * | 1/2000 | Phinney .................... B01J 2/00 |
| | | | 23/313 P |
| 6,132,484 A | * | 10/2000 | Phinney .................... B01J 2/14 |
| | | | 23/293 S |
| 6,293,985 B1 | * | 9/2001 | Phinney .................... B01J 2/12 |
| | | | 71/28 |
| 6,299,663 B1 | * | 10/2001 | Phinney .................... B01J 2/00 |
| | | | 71/34 |
| 6,331,193 B1 | * | 12/2001 | Phinney .................... B01J 2/14 |
| | | | 23/313 P |
| 6,454,979 B1 | * | 9/2002 | Phinney .................... B01J 2/14 |
| | | | 23/313 P |
| 2001/0042494 A1 | | 11/2001 | Welshimer et al. |
| 2003/0135957 A1 | * | 7/2003 | Phinney ............... C05G 3/0058 |
| | | | 23/313 P |
| 2004/0009878 A1 | * | 1/2004 | Lynch .................... A01N 25/14 |
| | | | 504/367 |
| 2017/0129823 A1 | * | 5/2017 | Kaps .................... C05G 3/0058 |

\* cited by examiner

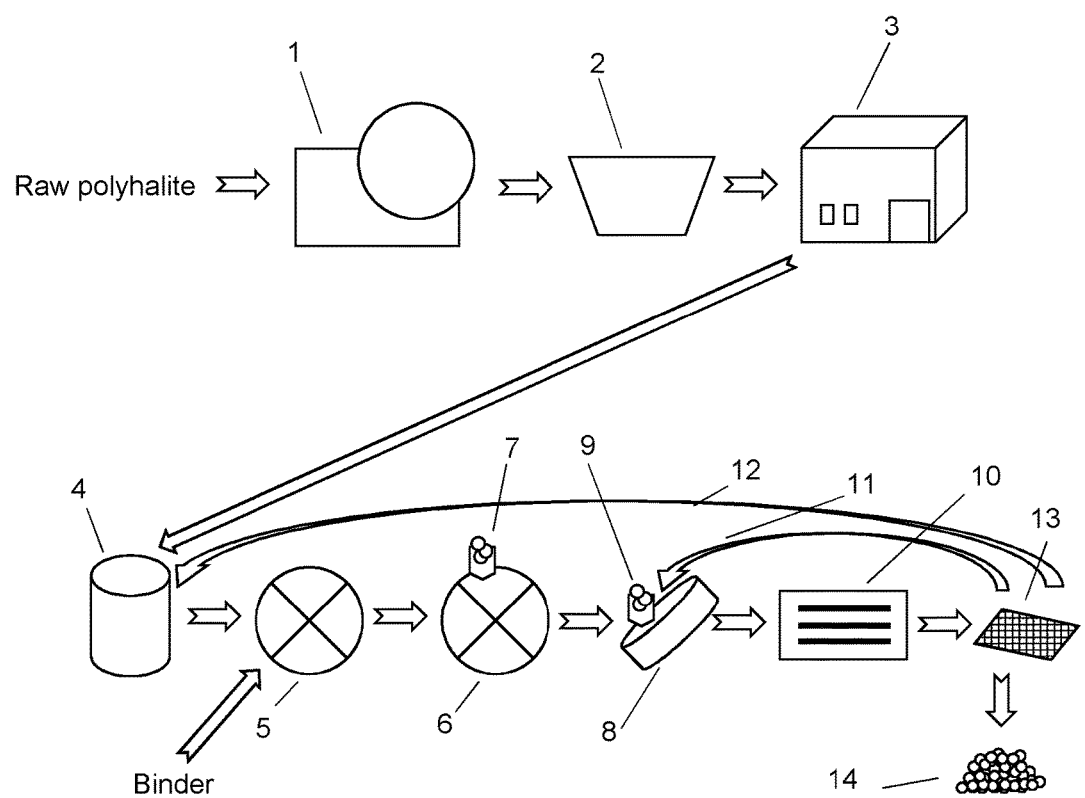

PELLETISING AN EVAPORITE MINERAL

CROSS-REFERENCES TO RELATED APPLICATIONS

This application is a national stage entry, filed under 35 U.S.C. §371, of International Application No. PCT/GB2015/051593, filed on Jun. 1, 2015, and claims the benefit of and priority to UK Patent Application No. GB1409800.8, filed Jun. 2, 2014, the entire contents of each are hereby incorporated herein by reference in their entireties and for all purposes.

This invention relates to forming pelletised products, for example for use as fertiliser.

Polyhalite is an evaporite mineral. It is a complex hydrated sulphate of potassium, calcium and magnesium of general formula $K_2Ca_2Mg(SO_4)_4 \cdot 2H_2O$. Deposits of polyhalite occur in, amongst other countries, Austria, China, Germany, India, Iran, Turkey, Ukraine, the UK and the USA.

Polyhalite has the capacity to be valuable as a source of agricultural fertiliser. In some prior art processes it has been proposed to decompose natural polyhalite to extract specific nutrients. See, for example, WO 2013/074328, U.S. Pat. No. 1,946,068 and U.S. Pat. No. 4,246,019. However, intact polyhalite is also usable as a fertiliser, being able to supply sulphur, potassium, calcium and magnesium to the soil.

Mineral polyhalite can be spread in raw, crushed form. That minimises processing costs, but it has a number of disadvantages. Once applied to the soil the raw mineral takes some time to break down, delaying the bioavailability of its constituents. If applied in chipped form, the polyhalite tends to be of irregular shape and size, meaning that there can be issues in applying it uniformly, and that it can be difficult to apply with some types of agricultural spreading machinery. Untreated powdered polyhalite might in some circumstances be capable of being uniformly spread. However, since polyhalite powder can be strongly hygroscopic, its mechanical properties can vary quickly and radically over time once exposed to air; and again it can be difficult to spread evenly with some types of machinery.

It is known to form urea into fertiliser pellets and to form limestone into pellets for dressing to increase soil pH. This can be done by mixing powdered urea or limestone with a binder and then processing it in a pan pelletiser.

It would be desirable to be able to form a pelletised product using evaporite minerals such as polyhalite as the feedstock. However, it has been found that it is difficult to obtain a reliable pelletised product from such feedstocks. One difficulty has been found to arise from the problems surrounding controlling the take-up of water by the evaporite mineral, resulting in uneven operation of the process. Another difficulty has been found to arise from the problems surrounding binding of evaporite mineral powder into pellets, with binding being unreliable in some operational circumstances.

According to the present invention there is provided a method for forming a pelletised evaporite mineral product, the method comprising: forming a material comprising a liquid and at least 50% by mass of an evaporite mineral powder; and processing the material using a pan pelletiser to form pellets comprising the material, the pan pelletiser being configured so that the mean dwell time of the material in the pan of the pelletiser is in the range from 60 to 120 seconds and the mean diameter of the pellets formed by the pelletiser is in the range from 1 to 8 mm.

The pan pelletiser may have a pan having a base and a wall surrounding and upstanding from the base. The interior of the pan may define a working region in which pellets are produced. The base of the pan may be angled with respect to the horizontal. The pelletiser may be configured to rotate the pan to thereby agglomerate material in the pan. The rotation may be about an axis transverse to the base.

The interior surface of the pan may be smooth. Alternatively the interior base of the pan may have a roughened surface relief. The roughened surface relief may be provided by discrete grains of a material adhered to the base of the pan by an adhesive. Those grains may be of a material different from the constituents of the pellets.

The bed may be flat or substantially flat. The bed may be angled at between 70 and 45° to the horizontal during the said processing step.

The method may comprise introducing liquid into the pan pelletiser during the said step of processing the material.

The liquid may comprise water. The liquid may comprise more than 95% or 99% water by weight. The said processing step may comprise introducing between 1 and 3% of liquid by reference to the mass of the material.

Immediately prior to the said processing step the material may comprise between 4% and 10% water.

The material may comprise a binder. The binder may comprise starch. The binder may comprise pre-gelled starch. The starch may comprise corn starch. The starch may be pre-gelled starch.

Immediately prior to the said processing step the material may be in the form of granules having a mass average grain size below 1.0 mm.

The mean diameter of the pellets formed by the pelletiser may be in the range from 2 to 5 mm.

The pellets may contain greater than 90% by mass of the evaporite mineral.

The evaporite mineral may be or comprise polyhalite. The evaporite mineral may be a blend of two or more evaporite components. Preferably such a blend comprises 80% or more polyhalite by weight.

The present invention will now be described by way of example with reference to the accompanying drawing.

FIG. 1 shows a generalised overview of a pelletising process.

In one example of a process, an evaporite mineral powder may be combined with a liquid to form a material comprising the and at least 50% by mass of the evaporite mineral powder. The material may then be processed using a pan pelletiser to form pellets comprising the material. The pan pelletiser may be configured so that the mean dwell time of the material in the pan of the pelletiser is in the range from 60 to 120 seconds and the mean diameter of the pellets formed by the pelletiser is in the range from 1 to 8 mm.

As indicated above, polyhalite is a complex hydrated sulphate of potassium, calcium and magnesium of general formula $K_2Ca_2Mg(SO_4)_4 \cdot 2H_2O$. Polyhalite has a Moh's hardness of around 2.5 to 3.5.

Once mined, polyhalite may be broken into blocks or chips of suitable size for transport and processing. For example, the as-mined rock may be fed to crushers such as jaw crushers and/or cone crushers in order to yield a chipped material of generally uniform size. It has been found that chips of largest dimension no greater than around 20 mm and/or of average dimension between 5 and 10 mm are convenient for transportation from a mine. In general it is preferred that after having been chipped the polyhalite is stored in a substantially airtight container, such as a closed bag formed of impermeable sheet, so that its ability to absorb moisture from the atmosphere is restricted. Another way to achieve a similar result is to pass the chipped polyhalite to the next stage of the process within a limited period of time, for example in less than 6, 12 or 24 hours after chipping, It may be desired to form the polyhalite into a spreadable fertiliser product. One way in which this can be done will now be described.

The raw or chipped polyhalite is processed to form a polyhalite powder. This may suitably be done by milling, for exampling in a ball mill (e.g. a continuous "Hardinge" ball mill) or more preferably an attritor mill. In an attritor mill the feedstock is agitated together with freely moving grinding elements such as steel balls. Air-swept suction may be applied in order to draw the milled material out of the mill. This allows the milling to be performed as a continuous process if desired, with chipped feedstock being added to the mill and powder being swept out of the mill by gas flow whilst the grinding elements continue to be agitated. The average grain size of the powder is dependent on various process parameters including the dwell time of the feedstock in the mill. Conveniently, the mill may be arranged to produce polyhalite powder grain size in the range from 50 to 400 µm, more preferably from 100 to 250 µm. Conveniently at least 50% or more preferably at least 70% of the mass of the polyhalite powder is composed of grains having a grain size, or a largest or average diameter, in the range from 50 to 400 µm, more preferably from 100 to 250 µm. The grain size may be as measured by means of a Malvern Mastersizer 2000 or as measured by means of a sieve shaker.

Compared to some other evaporite minerals polyhalite is generally viewed as being relatively stable in the presence of moisture. However, it has been found that recently powdered polyhalite is strongly hygroscopic to an extent that can greatly hinder its subsequent processing unless the level of moisture content is carefully managed. In particular, it has been found that the success of the pelletising process described herein is strongly dependent on the water content of the polyhalite during the mixing. For that reason, it has been found helpful to arrange that the delay between rendering the polyhalite from grains of an average size greater than 1 mm to grains of an average size below 1 mm is not more than 24 hours, more preferably not more than 12 hours, and still more preferably not more than 6 hours. It has been found that then the powdered polyhalite can be stored in ambient conditions without the need for additional drying before subsequent processing. If atmospheric conditions are particularly dry then the delay may be extended, and vice versa. Thus, in general it is preferred that the chipped polyhalite is milled into powder only shortly before it is to be processed further. It is preferred to cover the powdered polyhalite with an impermeable sheet or other closure so as to inhibit its take-up of water whilst being stored.

When the powdered polyhalite is incorporated into a fertiliser, it may be expected that using a smaller grain size of powder can increase the rate at which components of the polyhalite fertiliser become available in the soil due to their greater overall surface area. That may be advantageous in certain uses. However, the increased surface area per unit mass of finer polyhalite powders also gives them a tendency to absorb atmospheric water more rapidly which makes the pelletising process more difficult to control. Balancing these factors, it has been found that powder of a grain size in the range from 170 to 230 µm provides good results.

In the next processing step a binder is added to the polyhalite powder. The binder helps the polyhalite powder to adhere to itself and increases the strength of the eventual pellets. That is important because the pellets should preferably be capable of resisting mechanical breakdown when spread through conventional agricultural spreaders. The binder also renders the polyhalite powder more plastic, which aids in the subsequent processing steps. Any suitable binder may be used, but it has been found that pre-gelled corn starch is particularly suitable. This is believed to be due, at least in part, to it not greatly increasing the ability of the mixed product to absorb water. It is preferred that the binder is no more hydroscopic than pre-gelled corn starch. Alternative binders include pre-gelled starch from other natural or artificial sources, lignosulphates, cement, sodium silicate, potassium silicate, polyvinyl acetate, sugars and milled grain. The binder is preferably in powder form when added to the polyhalite powder. The binder may be at least partially hydrated. The optimal amount of binder may be determined by balancing the strength of the final product with the workability of the intermediate materials. If too little binder is added then the resulting pellets may have insufficient strength. If excess binder is added then the polyhalite/binder mixture can become too sticky to be easily processed. It has been found that for polyhalite powder of an average grain size of 200 µm, an addition of 1.5% by weight pre-gelled corn starch is highly effective. Using that addition in the process described herein has been found to increase the compression strength of the resulting pellets to 7 kgf, against just 1 kgf for pellets of polyhalite alone. This compares favourably with a generally accepted lower limit of 2.2 kgf for acceptable agricultural pellets.

Any suitable mixer may be used to combine the polyhalite and the binder. However, it has been found advantageous for the polyhalite and the binder to be combined in a first mixing step that is of relatively low shear, and subsequently in a second mixing step that is of relatively high shear. In the first mixing step it may be that no liquid, specifically no water, is added. In contrast, liquid, for example including water, may be added in the second mixing step. By mixing the polyhalite and the binder without the addition of water or other liquid the polyhalite can be conditioned and plasticised without its behaviour being substantially affected by take-up of water.

In one example the first and second mixing steps may be performed in a single mixing chamber of a mixer. To achieve this the mixer may be being operated in a relatively low shear manner during the first mixing step (e.g. by arranging that its blade(s) are driven with relatively low speed and/or power) and in a relatively high shear manner during the second mixing step (e.g. by arranging that its blade(s) are driven with relatively high speed and/or power). In another example different mixers may be used for the first and second mixing steps.

For example, the first mixing step may be performed in a ribbon blender. A ribbon blender is a mixer in which the feedstock is blended in a horizontal trough in which a helical blade rotates so as to agitate the components. In one specific example a U trough mixer or ribbon blender of the type made by Winkworth Machinery Ltd may be used. The polyhalite and the binder may be combined in such a mixer in batches or in a continuous stream, depending on the capabilities of the mixer.

In the first mixing step the polyhalite powder and the binder are preferably mixed for sufficient time to produce a homogeneous mixture.

Thus in one example, in the first mixing step a batch of 600 kg of milled polyhalite powder and 9 kg of pre-gelled standard grade corn starch as supplied by Ingredion Inc. may be fed to a Winkworth ribbon blender having a working volume of 1000 l. The agitator of the blender may then be run at 50 rpm for 30 minutes, during which time no liquid is added to the mixture. The resulting product is a dry blend polyhalite-based powder of good homogeneity.

When two mixers are being used, after the first mixing step the blended polyhalite powder and binder are passed to a second mixer for conditioning. The second mixer preferably performs mixing with higher shear than the first mixer.

The second mixer could, for example, be a pin mixer. In a pin mixer, a mixing chamber is swept by a rotor which carries a plurality of radially extending pins. The pin mixer may have a 40 hp motor and a working cavity of length around 1.5 m and diameter 30 cm. It may be operated at, for instance, 800 rpm.

In the second mixing step the material is preferably subject to intense mixing. Water—or other liquid, preferably comprising free water—is preferably added. The water or other liquid may be added during the second step by spraying directly into the mixing chamber whilst the polyhalite/binder mixture is being agitated. Alternatively a suitable quantity of water may be added to the polyhalite/binder mixture prior to the agitation involved in the second mixing step. If water is added then it may be found that the intense mixing of the second mixing step generates sufficient heat to liberate water vapour or steam. The addition of water at this stage encourages the plasticised polyhalite-containing powder to aggregate into a grit. Material may be retained in the mixer for around 30 to 45 s.

It has been found that it is important to control the water content of the polyhalite before and during the second mixing step. It has been found that recently ground polyhalite powder has a tendency to absorb water strongly from the atmosphere. If the polyhalite is ground to powder too long before the first and second mixing steps take place it has been found that even with no water being added during the second mixing step the output of the second mixing step can be poor, especially during humid weather conditions. One way to address this—if necessary—would be to dry the polyhalite before the second mixing process. However, it is preferred to grind the polyhalite into powder form not more than 24 hours, more preferably not more than 12 hours and still more preferably not more than 6 hours before it reaches the second mixing process. It is preferred to cover the ground polyhalite with an impermeable sheet or other closure so as to inhibit its take-up of water whilst being stored. When these precautions are observed it has been found that an addition of water of 5% by weight of solid ingredients during the second mixing process will provide a suitable product. Otherwise, less water may be added, but that can result in the process being considerably less predictable.

The duration of the second mixing step should be sufficient to adequately blend the polyhalite and binder to a state in which it exists as a free-flowing granular material, for example as non-adherent grains, of which preferably 90% or more by mass has a grain size in the range from 1.0 mm to dust.

Thus in one example, in the second mixing step approximately 600 kg of mixed polyhalite powder and binder may be progressively fed to a 40 hp pin mixer having a working volume of around 1000 l. The rotor of the mixer may then be run at 800 rpm. The pin mixer runs in a continuous process that outputs around 400 kg per hour with around 2 to 3 kg of material being worked in the chamber at any time. Over one hour 20 l of water may be progressively sprayed into the mixing chamber. The product or discharge from the second mixing step is a sand-like material, predominantly having a grain size below 1.1 mm in diameter. The discharge may be at a temperature of 50 to 60° C.

The grains of polyhalite and binder are then passed to a pelletiser for forming into pellets. Any suitable pelletiser may be used, but it has been found that a pan pelletiser is particularly effective. A pan pelletiser comprises a pan having a base and a rim upstanding from the base. The pan can be rotated about an axis transverse to the base. The pan is tilted so that material in the pan nestles in a lowermost region of the base, where it is restrained by the side wall. As a result, when the pan is rotated the material tumbles against itself and particles of the material can adhere to one other. Larger particles typically migrate to the top of the pile of material, and can drop over the rim of the pan into a collecting receptacle. Meanwhile further feedstock can be added to the pan. The pelletising can therefore be carried out as a continuous process.

The material that leaves the pan can be screened to separate in-size product from undersize and oversize product. Undersize product can be returned to the pelletiser. Oversize product can either (i) be roughly milled and added directly to the pelletiser or (ii) combined with incoming polyhalite chippings that are to be milled to a powder. Preferably the material is dried before being screened and/or re-milled. This can help to avoid the pellets being damaged in the screening process, and to avoid returning excessive moisture to the through flow.

It is desirable to maximise the proportion of the output of the pelletiser that is in-size, and particularly to minimise the amount of oversize output since that will be re-milled. To this end it is desirable to have good control over the feedstock to the pelletizer. In the case of polyhalite, that implies control over its moisture content. That control can be achieved using the methods described above. As indicated above, newly powdered polyhalite is strongly hygroscopic—to the extent that under some conditions free polyhalite powder can naturally absorb so much moisture from the atmosphere that the process is difficult to operate with reliability. For example, the material in the feed to the high-shear mixer may become clumpy, resulting in uneven flow to the high-shear mixer, which results in an uneven output.

A typical pan pelletiser permits adjustment of the tilt angle of the pan base relative to horizontal. Altering the tilt angle permits the dwell time of the pellets in the pelletiser, and hence the final pellet size, to be controlled. It has been found that an average pellet size in the range from 2 to 4 mm, and more specifically a size distribution in which at least 50% and more preferably 75% by number of the resulting pellets are in that range, produces good results. The state of the feedstock to the pelletiser, in cooperation with the operating state of the pelletiser, may be such that the mean retention time of material in the pelletiser is in the range from 30 to 200 seconds, more preferably from 30 to 60 seconds, most preferably around 45 seconds. To achieve this a pan base angle in the range from 70 to 45°, more preferably from 63 to 53° and most preferably around 58° may be found effective. The pan may be operated with a linear rim speed in the range from 2.0 to 2.5 $ms^{-1}$, more preferably in the range from 2.1 to 2.2 $ms^{-1}$.

It has been found that coating the interior base of the pelletiser with a high-grip coating, for example a coating of an adhesive having a grit incorporated therein, improves the pelletising efficiency.

The pan pelletiser may have a diameter of around 1.5 m or 1.8 ml and a depth of around 22 cm. The pan pelletiser may, for example be a model P45 or P60 pan pelletiser as supplied by Mars Mineral.

During the operation of the pelletiser additional water is added to the material being processed. The water may be added by spraying into the pan, preferably in the region of the lower part of the pan bed, where the material that is being agglomerated tends to settle. The amount of water added may be between 1% and 3%, more preferably around 2%, by weight of the solid feedstock. Where the pelletising is performed as a continuous process, the spray rate of the water can be set accordingly. For example, if the steady-state feed rate of polyhalite-containing granules is 6 to 8 kg per minute then the spray rate of the water may be around 0.12 to 0.16 liters per minute.

As indicated above, any pellets that are out of the desired size range can be reground (if oversize) or returned to the pan pelletiser (if undersize). It has been found that by using the steps described above, an in-specification yield of 85-90% by weight of the output from the pelletiser. By contrast, typical in-specification yields of limestone pelletising processes might be around 10%, the remaining 90% having to be recirculated.

The output of the pelletiser is wet, substantially spherical pellets. These are conveniently dried before packaging. To achieve this the pellets that have been output from the pelletiser can be passed to a drier. It has been found that a retention time of around 3 minutes in a drier capable of heating the pellets to a temperature of around 150° C. is sufficient to adequately dry the pellets. Moisture can be extracted from the dryer using a reverse jet air filter. The operating temperature and retention time in the dryer can be selected to provide pellets of the desired strength for subsequent handling.

Finally the pellets can be cooled and packaged, for example in 600 kg bags or 25 kg sacks, or shipped loose for use or further processing elsewhere FIG. 1 shows a generalised overview of the process described above. As-mined raw polyhalite is primary crushed in a jaw crusher 1 and secondary crushed in a cone crusher 2. This produces a chipped polyhalite product. The chipped polyhalite may be stored, e.g. in a warehouse 3, until shortly before it is to be processed by the subsequent steps. In contrast, preferably the steps illustrated at 4 to 6 follow quickly one after the other, reducing the scope for the polyhalite powder to absorb ambient moisture. When required, the chipped polyhalite can be withdrawn from the store 3 and passed to an attritor mill or continuous ball mill 4 where it is rendered to a powder. The polyhalite powder is combined with a binder in a low-shear mixer 5, and then the blended powder and binder are mixed in a high-shear mixer 6, with the addition of water as illustrated at 7. The output of the high-shear mixer is a granulate product. The granulate product is applied to a pan pelletiser 8, to which additional water is added as illustrated at 9. The pan pelletiser causes the granules to aggregate into substantially spherical pellets, which gradually exit the pelletiser. The exiting pellets are dried in a drier 10 and then sized by a set of screens 13. Undersize pellets are returned to the pelletiser as indicated at 11. Oversize pellets are returned to the attritor mill as indicated at 12. The final product at 14 consists of pellets of substantially spherical form and within the size limits defined by the screens 10. Those pellets can then be packaged and supplied for agricultural use. Finally they can be spread on a field or other agricultural or horticultural substrate to act as a fertiliser.

Conveyor belts, auger conveyors or other handling apparatus can be used to move the components between processing stations.

Other additives may be included in the pellets. Such additives may one or more of the following, in any combination:
- a component having the effect of chemically and/or mechanically stabilising and/or preserving the pellets: for example to increase their shelf life, reduce their susceptibility to environmental contaminants or to reduce the likelihood of them being broken up during spreading;
- a component having the effect of enhancing the fertilising effect of the polyhalite: for example by accelerating or retarding the breakdown of the polyhalite in the field;
- a component having the effect of protecting or enhancing the growth of crops by means other than fertilising: for example a herbicide, fungicide, insecticide, rodenticide, hormone, plant stimulant or mycorrhizal fungus or spore;
- a seed: which may be a seed of an angiosperm and/or of a crop species (e.g. a cereal such as wheat, maize, rice, millet, barley, oats or rye);
- a further fertiliser composition in addition to the polyhalite: for example a source of nitrogen and/or phosphorus;
- a pigment;
- a component having the effect of altering soil pH: for example lime, sulphur or a sulphate.

Such a component may be added at various stages in the process, for example it could be combined with the polyhalite powder prior to or during the first mixing stage as described above, or with the binder prior to the first mixing stage as described above, or with the polyhalite/binder mix between the first and second mixing steps as described above, or during the second mixing step as described above, or it could be added to the pan pelletiser, or it could be sprayed or otherwise coated on to the pellets before or after drying.

The polyhalite content of the resulting pellets is preferably greater than 75% by weight, more preferably greater than 80% and most preferably greater than 90%. In the case of pellets that contain seeds this may optionally be varied such that the polyhalite content of the pellets excluding the weight of the seeds may be greater than 75% by weight, more preferably 80%, most preferably greater than 90%.

The pellets are preferably substantially spherical, and of substantially uniform volume and mass. The pellets may have a mean Wadell sphericity of greater than 0.85, 0.90 or 0.95. The pellets are preferably substantially free from voids, for example having not more than 1%, 2% or 5% by volume of air.

The process as described above may be used for pelletising minerals other than polyhalite, and in particular for pelletising feedstocks composed principally of one or more evaporite minerals, especially other chloride minerals. These may include any one or more of Anyhdrite, Carnalite, Gypsum, Halite, Kainite, Kieserite, Langbeinite and/or Sylvite. The process is especially suitable for pelletising feedstocks composed principally of minerals that are substantially hygroscopic in recently powdered form and/or that have a Moh's hardness in the range from 2 to 4. The resulting pellets may be used for purposes other than fertilisation.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for forming a pelletised evaporite mineral product, the method comprising:
forming a material comprising a liquid and at least 50% by mass of an evaporite mineral powder, wherein the evaporite mineral is polyhalite; and
processing the material using a pan pelletiser to form pellets comprising the material, the pan pelletiser being configured so that the mean dwell time of the material in the pan of the pelletiser is in the range from 60 to 120 seconds and the mean diameter of the pellets formed by the pelletiser is in the range from 1 to 8 mm.

2. A method as claimed in claim 1, wherein the pan pelletiser has a pan having a base and a wall surrounding and upstanding from the base, the base of the pan being angled with respect to the horizontal and the pelletiser being configured to rotate the pan to thereby agglomerate material in the pan; wherein the interior surface of the pan is smooth.

3. A method as claimed in claim 1, wherein the pan pelletiser has a pan having a base and a wall surrounding and upstanding from the base, the base of the pan being angled with respect to the horizontal and the pelletiser being configured to rotate the pan to thereby agglomerate material in the pan; wherein the interior base of the pan has a roughened surface relief.

4. A method as claimed in claim 3, wherein the roughened surface relief is provided by discrete grains of a material adhered to the base of the pan by an adhesive.

5. A method as claimed in claim 2, wherein the bed is flat and is angled at between 70 and 45° to the horizontal during the said processing step.

6. A method as claimed in claim 1, comprising introducing liquid into the pan pelletiser during the said step of processing the material.

7. A method as claimed in claim 6, wherein the liquid comprises water.

8. A method as claimed in claim 6, wherein the said processing step comprises introducing between 1 and 3% of liquid by reference to the mass of the material.

9. A method as claimed in claim 1, wherein immediately prior to the said processing step the material comprises between 4% and 10% water.

10. A method as claimed in claim 1, wherein the material comprises a binder.

11. A method as claimed in claim 10, wherein the binder comprises starch.

12. A method as claimed in claim 11, wherein the binder comprises pre-gelled starch.

13. A method as claimed in claim 11, wherein the starch comprises corn starch.

14. A method as claimed in claim 1, wherein immediately prior to the said processing step the material is in the form of granules having a mass average grain size below 1.0 mm.

15. A method as claimed in claim 1, wherein the mean diameter of the pellets formed by the pelletiser is in the range from 2 to 5 mm.

16. A method as claimed in claim 1, wherein the pellets contain greater than 90% by mass of the evaporite mineral.

* * * * *

UNITED STATES PATENT AND TRADEMARK OFFICE
CERTIFICATE OF CORRECTION

| | |
|---|---|
| PATENT NO. | : 9,856,180 B2 |
| APPLICATION NO. | : 15/316127 |
| DATED | : January 2, 2018 |
| INVENTOR(S) | : Steve Farnworth et al. |

It is certified that error appears in the above-identified patent and that said Letters Patent is hereby corrected as shown below:

On the Title Page

Please correct (73) Assignee by deleting "SIRIUS MINERALS PLC" and inserting the current assignee of --YORK POTASH LTD--

Signed and Sealed this
Twenty-seventh Day of December, 2022

Katherine Kelly Vidal
*Director of the United States Patent and Trademark Office*